United States Patent
Day

(10) Patent No.: US 9,847,640 B2
(45) Date of Patent: Dec. 19, 2017

(54) SYNCHRONOUS CONDENSER

(71) Applicant: General Electric Company, Schenectady, NY (US)

(72) Inventor: Scott Arthur Day, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 755 days.

(21) Appl. No.: 14/447,947

(22) Filed: Jul. 31, 2014

(65) Prior Publication Data

US 2016/0036230 A1   Feb. 4, 2016

(51) Int. Cl.
*H02J 3/18* (2006.01)
*H02K 7/118* (2006.01)
*H02K 7/18* (2006.01)

(52) U.S. Cl.
CPC ............ *H02J 3/1885* (2013.01); *H02K 7/118* (2013.01); *H02K 7/1823* (2013.01); *Y02E 40/32* (2013.01)

(58) Field of Classification Search
CPC ..... H02J 3/1885; H02K 7/118; H02K 7/1823; Y02E 40/32
USPC ........................................................ 307/127
See application file for complete search history.

(56) References Cited

U.S. PATENT DOCUMENTS

| | | | |
|---|---|---|---|
| 4,013,937 A | 3/1977 | Pelly et al. | |
| 5,675,188 A * | 10/1997 | Utamura | F02C 9/28 290/40 C |
| 5,886,505 A | 3/1999 | Giberson | |
| 6,093,975 A | 7/2000 | Peticolas | |
| 6,140,803 A | 10/2000 | Hurley et al. | |
| 6,281,601 B1 * | 8/2001 | Edelman | H02J 3/1885 290/52 |
| 6,333,622 B1 | 12/2001 | Fogarty et al. | |
| 6,504,261 B2 | 1/2003 | Fogarty et al. | |
| 6,559,559 B2 | 5/2003 | Cratty | |
| 6,897,577 B2 | 5/2005 | Weeber et al. | |
| 7,523,603 B2 * | 4/2009 | Hagen | F01K 21/047 422/607 |
| 8,500,969 B2 | 8/2013 | Guelbenzu Michelena et al. | |
| 2001/0054823 A1 | 12/2001 | Fugarty et al. | |
| 2002/0060556 A1 * | 5/2002 | Wall | H02J 3/38 322/29 |
| 2004/0008010 A1 * | 1/2004 | Ebrahim | H02P 9/04 322/44 |
| 2005/0012397 A1 * | 1/2005 | Weeber | H02J 15/00 307/78 |
| 2006/0213183 A1 * | 9/2006 | Althaus | F01D 25/305 60/274 |
| 2010/0036589 A1 * | 2/2010 | Ando | B60K 6/445 701/105 |
| 2010/0072757 A1 * | 3/2010 | Kealy | F01N 13/04 290/1 A |

(Continued)

*Primary Examiner* — Zeev V Kitov
*Assistant Examiner* — Brian K Baxter
(74) *Attorney, Agent, or Firm* — Eversheds Sutherland (US) LLP

(57) ABSTRACT

The present application thus provides a method of operating a synchronous condenser. The method may include the steps of accelerating a gas turbine engine to full speed no load conditions, connecting a generator attached to the gas turbine engine to an electric power grid, turning off a flow of fuel to the gas turbine engine, operating the generator in a synchronous condenser mode, and providing or absorbing reactive power to or from the electric power grid.

18 Claims, 2 Drawing Sheets

(56) References Cited

U.S. PATENT DOCUMENTS

| | | | |
|---|---|---|---|
| 2010/0326075 A1* | 12/2010 | Fong | F01K 25/06 60/650 |
| 2011/0115223 A1* | 5/2011 | Stahlkopf | F01K 13/02 290/7 |
| 2011/0215640 A1* | 9/2011 | Donnelly | H02J 1/10 307/21 |
| 2011/0267013 A1 | 11/2011 | Marken et al. | |
| 2012/0223531 A1* | 9/2012 | Brooks | F01D 15/10 290/1 R |
| 2012/0306458 A1* | 12/2012 | Fogarty | H02P 9/08 322/32 |
| 2013/0008172 A1 | 1/2013 | Erickson et al. | |
| 2013/0104558 A1 | 5/2013 | Varillas et al. | |
| 2013/0221877 A1 | 8/2013 | Marken | |
| 2014/0000270 A1* | 1/2014 | Dobbeling | F02C 3/04 60/772 |
| 2015/0377057 A1* | 12/2015 | Desabhatla | F01D 15/10 700/287 |

* cited by examiner

SYNCHRONOUS CONDENSER

TECHNICAL FIELD

The present application and the resultant patent relate generally to gas turbine engines and more particularly relate to a synchronous condenser attached to a gas turbine engine to provide electric power grid stability without further mechanical and/or electrical components.

BACKGROUND OF THE INVENTION

Synchronous condensers are utilized in a wide variety of applications such as power generation. Synchronous condensers typically are utilized to adjust conditions on an electric power distribution grid. A synchronous condenser is a specialized motor with an unattached shaft that spins freely. The synchronous condenser may generate or absorb reactive power as needed to support the voltage and/or maintain a power factor on the electric power distribution grid.

Similarly, synchronous generators driven by turbines or other types of power sources are commonly used by utilities to produce electrical energy. After years of use, a power utility may retire or decommission a synchronous generator from use as a power generation unit. In some cases, it may be desirable to use these retired synchronous generators as synchronous condensers to generate reactive power or absorb reactive power from the electric power grid. A retired synchronous generator generally must be decoupled from the turbine shaft before being used as a synchronous condenser. Instead, a starting motor may be attached to the shaft to bring the synchronous generator up to operational speed. Attaching the starting motor to the shaft, however, may be time consuming. Moreover, the starting motor needs to be designed to withstand any operational events such as electrical faults in the motor or the synchronous condenser, overspeed events, shaft failures, and the like. A sufficient amount of space and power also may be required to position and drive the starting motor or other device used to rotate the shaft.

There is thus a desire for an improved and/or simplified synchronous condenser. Such a synchronous condenser may generate and/or absorb reactive power so as to provide stability to an electric power grid without the need for a starting motor or types of mechanical and/or electrical devices that may require space and parasitic power to operate.

SUMMARY OF THE INVENTION

The present application and the resultant patent thus provide a method of operating a synchronous condenser. The method may include the steps of accelerating a gas turbine engine to full speed no load conditions, connecting a generator attached to the gas turbine engine to an electric power grid, turning off a flow of fuel to the gas turbine engine, operating the generator in a synchronous condenser mode, and providing or absorbing reactive power to or from the electric power grid.

The present application and the resultant patent further provide a gas turbine engine. The gas turbine engine may include a combustor, a turbine, a generator, and a shaft connecting the turbine and the generator. The turbine rotates the shaft to drive the generator when the generator is in an active power mode and the generator rotates the shaft when the generator is in a synchronous condenser mode providing reactive power.

The present application and the resultant patent further provide a synchronous condenser system. The synchronous condenser system may include a combustor, a turbine, a generator, and a shaft. The generator freely spins the shaft when the generator is in a synchronous condenser mode to provide and absorb reactive power to the electric power grid.

These and other features and improvements of the present application and the resultant patent will become apparent to one skilled in the art upon review of the following detailed description and taken in conjunction with the several drawings and the appended claims.

DETAILED DESCRIPTION

Figure 1:
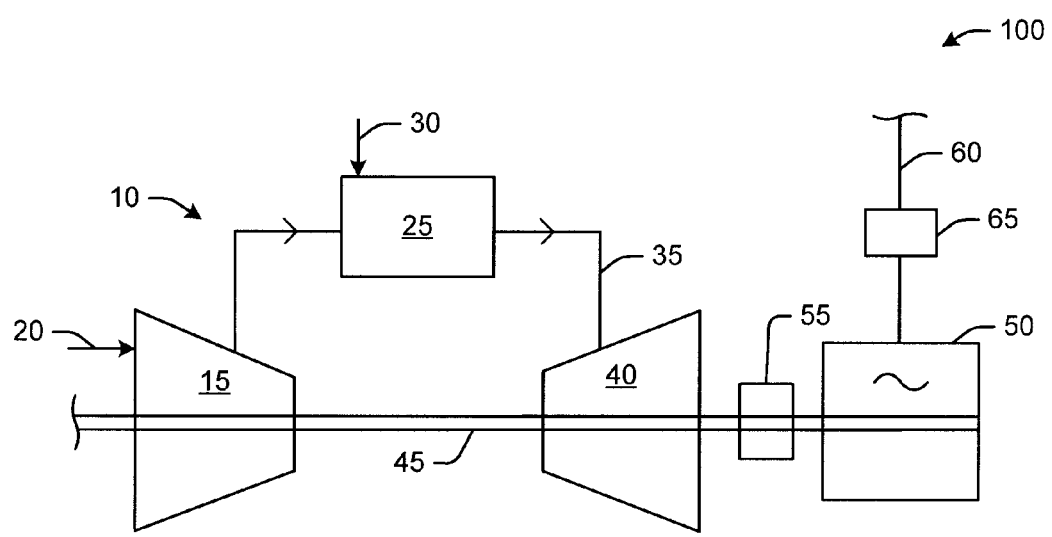
FIG. 1 is schematic diagram of a gas turbine engine with a synchronous condenser system as may be described herein.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of the combustors 25 arranged in a circumferential array or otherwise. The flow of combustion gases 35 is delivered in turn to a turbine 40. The flow of combustion gases 35 drives the turbine 40 so as to produce mechanical work. The mechanical work produced in the turbine 40 drives the compressor 15 via a shaft 45 and an external load such as an electrical generator 50 and the like. A number of bearings 55 may support the shaft 45 about the generator 50. The generator 50 may be in communication with an electric power grid 60 and the like via a generator circuit breaker 65. Other components and other configurations may be used herein.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

In the present example, the generator 50 also may be used as a synchronous condenser system 100 as may be described herein. Instead of using a starting motor and the like as described above, the synchronous condenser system 100 may be brought up to speed by the gas turbine engine 10. Once up to speed, the shaft 45 may remain attached to the gas turbine engine 10 and spin freely. The gas turbine engine 10 thus may provide active power in an active power mode and reactive power in a synchronous condenser mode.

Figure 2:
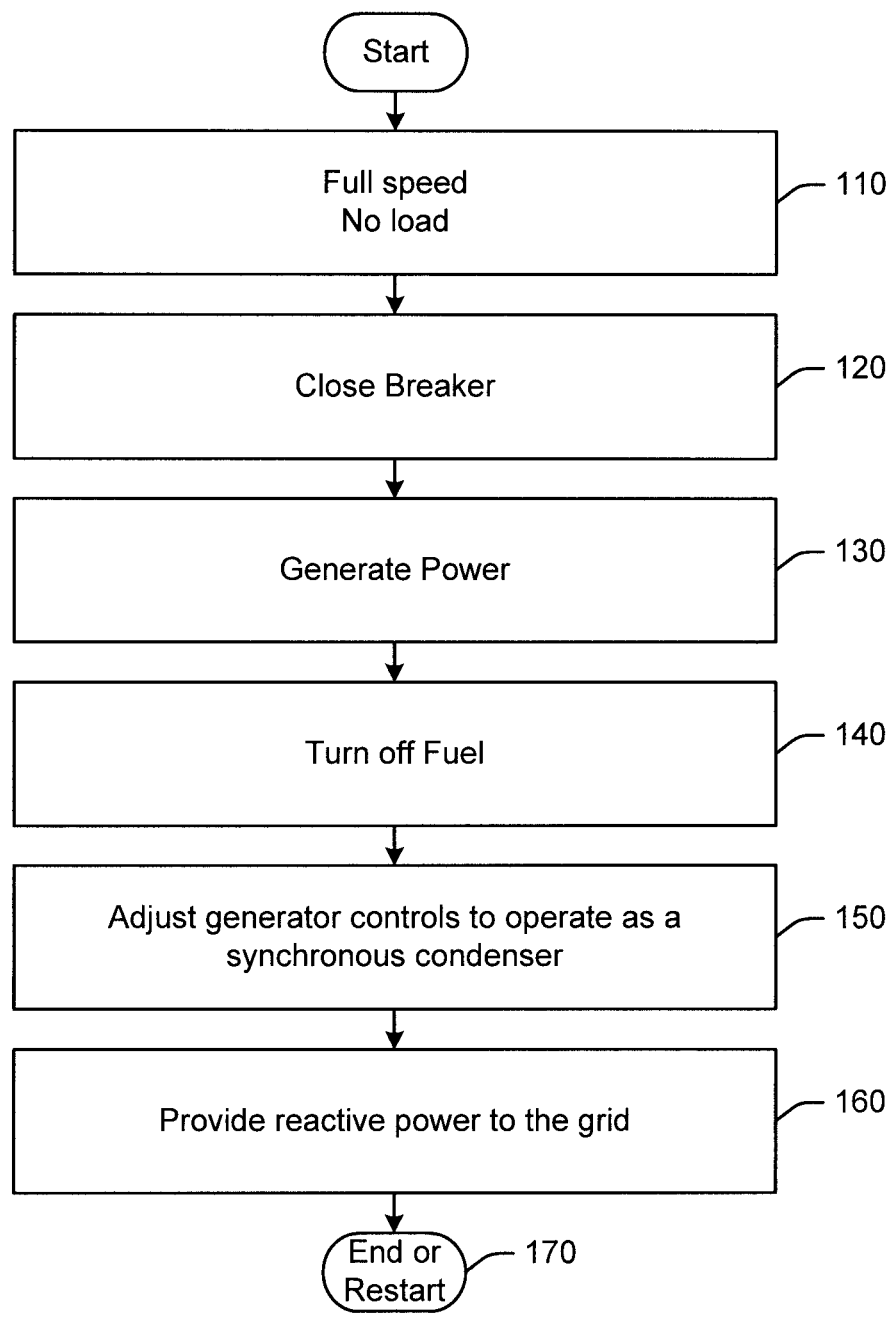
FIG. 2 is a flow chart showing the operation of the synchronous condenser system of FIG. 1.

An example of the operation of the synchronous condenser system 100 is shown in the flow chart of FIG. 2. At step 110, the gas turbine engine 10 may be accelerated to full speed no load conditions via a static start or other types of conventional starting procedures. At step 120, the generator circuit breaker 65 may be closed once the generator 50 reaches the frequency, the voltage, and/or the phase angle of the electric power grid 60. At step 130, the generator 50 now may produce power for the electric power grid 60 in the active power mode. At step 140, the flow of fuel 30 may be turned off to the combustor 25 and the compressor 15 may operate at minimal conditions, i.e., starting bleeds may be open, inlet guide vanes may be set at low positions, and the like. At step 150, the controls of the generator 50 may be set to begin operation as the synchronous condenser system 100. At step 160, the synchronous condenser system 100 may begin providing megavars to the electric power grid 60, i.e., reactive power (volt-amperes reactive) in the synchronous condenser mode. The synchronous condenser system 100 thus may produce or absorb reactive power in the synchronous condenser mode with the gas turbine engine 10 attached to the spinning shaft 45. At step 170, the gas turbine engine 10 may be restarted if desired by refueling and following conventional restart procedures. The gas turbine engine 10 thus may again produce active electrical power in the active power mode.

The gas turbine engine 10 thus provides both active and reactive power to help provide grid stability. The generator 50 provides active power while in the active power mode and reactive power while in the synchronous condenser mode. Moreover, the use of the synchronous condenser system 100 also provides improved turndown capability and a reduction in overall emissions. Gas turbine engines typically have a minimum load required to remain in emissions compliance. The use of the synchronous condenser system 100 allows a utility to stay synchronized with the electric power grid but with the fuel turned off and, hence, zero emissions. The gas turbine engine 10 may be refueled and provide active power when needed. The gas turbine engine 10 thus may use the synchronous condenser system 100 without the use of a clutch or disengagement of the shaft 45 and the space required to do so. The synchronous condenser system 100 and the methods described herein may be original equipment or part of a retrofit. The synchronous condenser system 100 thus provides grid stability, emissions turndown, and load rejection/load shedding in an efficient manner without the use of additional mechanical and/or electrical components and the space generally required.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. A method of operating a synchronous condenser, comprising:
   accelerating a gas turbine engine to full speed no load conditions;
   connecting a generator attached to the gas turbine engine to an electric power grid;
   turning off a flow of fuel to the gas turbine engine while a compressor of the gas turbine engine operates at minimal conditions;
   operating the generator in a synchronous condenser mode; and
   providing or absorbing reactive power to or from the electric power grid.

2. The method of operating a synchronous condenser of claim 1, where the step of operating the generator in a synchronous condenser mode comprises maintaining the generator attached to a shaft of the gas turbine engine.

3. The method of operating a synchronous condenser of claim 2, wherein the step of maintaining the generator attached to a shaft of the gas turbine engine comprises maintaining the shaft spinning.

4. The method of operating a synchronous condenser of claim 1, further comprising the step of producing active power after the connecting step.

5. The method of operating a synchronous condenser of claim 1, further comprising the steps of refueling the gas turbine engine and providing active power to the electric power grid.

6. The method of operating a synchronous condenser of claim 1, wherein the step of turning off a flow of fuel to the gas turbine engine comprises turning off the flow of fuel to a combustor of the gas turbine engine.

7. The method of operating a synchronous condenser of claim 1, wherein the step of connecting the generator to an electric power grid comprises closing a generator circuit breaker.

8. The method of operating a synchronous condenser of claim 7, wherein the generator circuit breaker may be closed once the generator reaches a frequency, a voltage, and/or a phase angle of the electric power grid.

9. The method of operating a synchronous condenser of claim 1, wherein the step of operating the generator in a synchronous condenser mode comprises the gas turbine engine producing no combustion gases.

10. A gas turbine engine, comprising:
    a combustor;
    a turbine;
    a generator; and
    a shaft;
    wherein the shaft connects the turbine and the generator; and
    wherein the turbine rotates the shaft to drive the generator when the generator is in an active power mode and wherein the generator rotates the shaft when the generator is in a synchronous condenser mode; and
    wherein there is no flow of fuel to the combustor and no flow of combustion gases from the combustor in the synchronous condenser mode.

11. The gas turbine engine of claim 10, wherein the generator is in communication with an electric power grid.

12. The gas turbine engine of claim 11, wherein the generator produces active power to the electric power grid when the generator is in the active power mode.

13. The gas turbine engine of claim 11, wherein the generator produces or absorbs reactive power to or from the electric power grid when the generator is in the synchronous condenser mode.

14. The gas turbine engine of claim 11, wherein the generator is in communication with the electric power grid via a generator circuit breaker.

15. The gas turbine engine of claim 10, further comprising a flow of fuel to the combustor in the active power mode.

16. The gas turbine engine of claim 10, further comprising a flow of combustion gases from the combustor in the active power mode.

17. The gas turbine engine of claim 10, wherein the turbine is operated at full speed no load conditions before entry into the synchronous condenser mode.

18. A synchronous condenser system, comprising:
a combustor;
a turbine;
a generator; and
a shaft;
wherein the generator freely spins the shaft when the generator is in a synchronous condenser mode producing or absorbing reactive power, and wherein there is no flow of fuel to the combustor and no flow of combustion gases from the combustor in the synchronous condenser mode.

* * * * *